United States Patent [19]
Fuller et al.

[11] Patent Number: 5,219,315
[45] Date of Patent: Jun. 15, 1993

[54] WATER EFFECTS ENHANCED MOTION BASE SIMULATOR RIDE

[76] Inventors: Mark Fuller, 10711 Bluffside Dr., #101, Studio City, Calif. 91604; Alan S. Robinson, 5344 C N. Peck Rd., El Monte, Calif. 91732

[21] Appl. No.: 723,224

[22] Filed: Jun. 28, 1991

[51] Int. Cl.$^5$ .............................................. A63G 31/16
[52] U.S. Cl. ...................................... 472/59; 472/118; 472/128
[58] Field of Search .................................. 472/59-61, 472/118, 128

[56] References Cited

U.S. PATENT DOCUMENTS

| | | | |
|---|---|---|---|
| 838,989 | 12/1906 | Hart | 472/60 |
| 1,789,680 | 1/1931 | Gwinnett | 472/60 |
| 3,542,934 | 11/1970 | Warhurst et al. | 472/60 |

Primary Examiner—Richard E. Chilcot, Jr.
Attorney, Agent, or Firm—Blakely, Sokoloff, Taylor & Zafman

[57] ABSTRACT

A simulator for water rides, that has a raft which is moved about such that it approximates the movement of a raft floating along a body of water. The simulator has a theater projection system constructed to display visual images onto a screen located inside a simulator room. The visual images typically being scenes of a rapidly flowing river as seen from the front of a raft floating down the body of water. Within the room is a raft constructed to support an audience while they view the visual images. The raft is surrounded by a pool of water that can have valves or actuators incorporated to create waves and water mist to simulate a river. The raft can be moved within the pool, by displacing the water beneath the raft such that the raft moves in conjunction with the scene depicted on the screen. Water displacement may be induced by a wave created in the pool, or by pushing the water under the raft with actuators or a flexible plate located at the bottom of the pool directly under the raft. In the alternative the raft can be attached to a flexible plate, wherein the flexible plate can be bent and moved about a staff that elevates the raft above the pool floor. The devices that move the raft can be connected to a computer that moves the raft in accordance with a set of operating instructions provided by a computer program, such that the raft moves in conjunction with the scenes depicted on the screen.

48 Claims, 3 Drawing Sheets

WATER EFFECTS ENHANCED MOTION BASE SIMULATOR RIDE

BACKGROUND OF THE INVENTION

1. Field of the Invention

This invention relates to a simulator that simulates a raft flowing through a body of water.

2. Description of Related Art

One of the more popular attractions at amusement parks are the simulation rooms that provide an audience with the sensation that they are participating in an activity such as flying a hand glider or riding a roller coaster. The simulators have a projector or a series of projectors that display a viewing image onto a screen that sometimes extends around the periphery of the room. The room is completely darkened such that the only thing visible to the audience are the viewing images. This creates an effect wherein the audience believes that it is actually flying or riding, etc. In some simulators the room or floor on which the audience stands is actually tilted to provide the audience with the additional sensation that they are moving with the viewing image displayed on the screen. For instance flight simulators that train aircraft pilots have a cabin that houses the pilots, the cabin moves in conjunction with the image on the screen so that the pilots feel as if they are flying.

Water rides involving dropping down a chute in a log or floating in a raft on a river, are particularly popular with the participants who frequently are splashed with water. Unfortunately creating a ride to allow a raft or canoe to float down a river, typically requires creating a body of water which is both expensive and covers a large area of land. Simulating a raft ride is an alternative that allows the operator to "send" the audience down treacherous rivers that are impractical to physically reproduce. It would be desirable to have the audience sit in a raft while watching the viewing images and have the raft move in conjunction with the image that is displayed. The movement of a raft is quite distinctive from the movement of a roller coaster or a glider, wherein the mere tipping or rotation of the floor does not give the same effect as riding a raft through a body of water. Additionally, it would be preferable to have water hit against the raft and possibly splash the audience. To date there is not a simulator that can move the raft such that the passengers are provided with the sensation that they are floating on water.

SUMMARY OF THE INVENTION

The present invention is a simulator for water rides, that has a raft which is moved about such that it approximates the movement of a raft floating along a body of water. The simulator has a theater projection system constructed to display visual images onto a screen located inside a simulator room. The visual images typically depict scenes of a rapidly flowing river as seen from the front of a raft floating down the body of water. Within the room is a raft constructed to support an audience while they view the visual images. The raft is surrounded by a pool of water that can have valves or actuators incorporated to create waves and water mist to simulate a river. The raft can be moved within the pool, by displacing the water beneath the raft such that the raft moves in conjunction with the scene depicted on the screen. Water displacement may be induced by a wave created in the pool, or by pushing the water under the raft with actuators or a flexible plate located at the bottom of the pool directly under the raft. In the alternative the raft can be attached to a flexible plate, wherein the flexible plate is bent and moved about a staff that elevates the raft above the pool floor. The means for moving the raft can be connected to a computer that moves the raft in accordance with a set of operating instructions provided by a computer program, such that the raft moves in conjunction with the scenes depicted on the screen.

Therefore it is an object of this invention to provide a simulator for water rides that has a raft which moves in conjunction with the scene displayed on a screen.

It is also an object of this invention to provide a simulator for rides that has a pool of water that simulates a moving body of water.

BRIEF DESCRIPTION OF THE DRAWINGS

The objects and advantages of the present invention will become more readily apparent to those skilled in the art after reviewing the following detailed description and accompanying drawings, wherein.

DETAILED DESCRIPTION OF THE INVENTION

Figure 1:
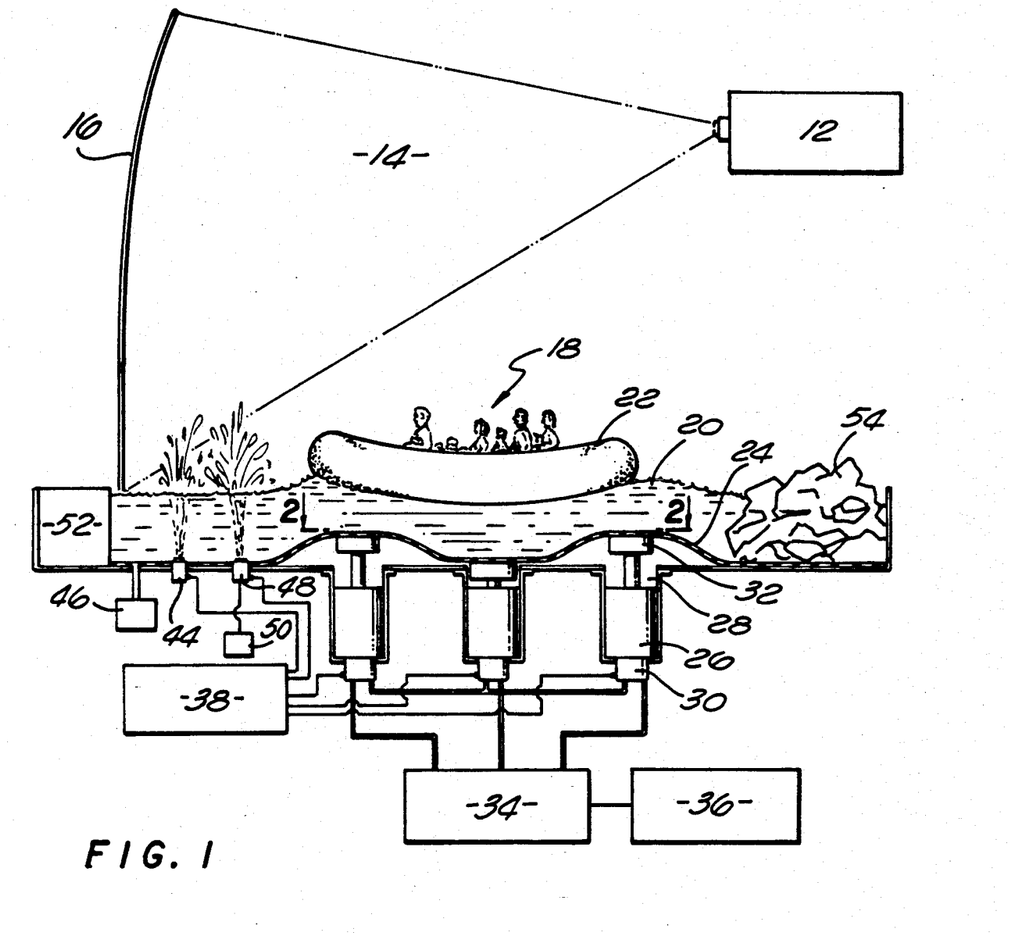
FIG. 1 is a side view of a simulator of the present invention showing a raft in a pool of water, the pool has a diaphragm at the bottom which is moved by a plurality of actuators in accordance with instructions provided by a computer such that the movement of the raft simulates the motion of a raft as depicted on the screen.

Referring to the drawings more particularly by reference numbers, FIG. 1 shows a simulator 10 used to simulate rafting down a rapid river. Though the simulation of rafting is shown, it is to be understood that the invention can be used to simulate a canoe or other floatation device that is floating or is propelled through any type of body of water, whether it be a rapidly flowing river or a calm lake. As an example, the simulator could depict a hydrofoil travelling through the everglades. The simulator 10 has a theater projection system with a projector 12 that displays visual images 14 onto a screen 16. The visual images 14 depict a raft floating down a river. The projection system may have one projector 12 and one screen 16, or a plurality of projectors and adjacent screens that extend around and form a circular shaped enclosure to provide an audience 18 with 360 degrees of viewing images. These types of theater systems are known in the art and are typically used in amusement parks to simulate flying a glider or riding a roller coast, etc. To improve the efficiency of the projection system, the simulator is housed within an enclosed room that is constructed to prevent outside light from entering the room, so that the audience 18 only sees what is displayed on the screen 16. Also within the room is a first pool of water 20 located below the projector screen 16. The pool 20 being constructed to simulate the body of water depicted on the screen 16. The pool 20 can extend under the screen 16 and be in close proximity thereof, so that there is no visual line of separation between the pool 20 and screen 16. Within the pool 20 is a raft 22 constructed to support the audience 18. The raft 22 is preferably constructed from two layers of flexible material such that the raft 22 can be inflated with air. The raft 22 can also have a flat bottom and wide walls as is typically found in the art. The raft 22 is located within the room so that the audience 18 can view the visual images 14 displayed on the screen 16. To provide the audience 18 with the sensation that they are riding on a raft 22, means are incorporated to move the raft 22 in conjunction with the scenes depicted on the screen 16.

Figure 2:
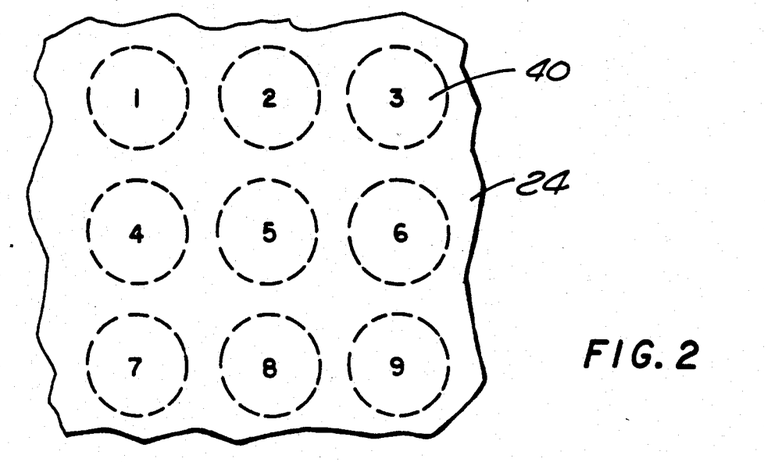
FIG. 2 is an enlarged sectional view of FIG. 1 showing an arrangement of actuators.

In the embodiment shown in FIG. 1, the raft 22 is located approximately one to two feet above the bottom of the pool 20, which has a diaphragm 24 along the same. The diaphragm 24 being preferably constructed from a thick hard rubber sheet that covers the pool bottom, particularly the area directly under the raft 22. Beneath the diaphragm 24 is a plurality of actuators 26 that extend and retract in a direction essentially perpendicular to the raft 22. Each actuator is housed in a cavity 28 and is connected to a solenoid flow valve 30 to control the movement of the actuators 26. The actuation system may be either hydraulic or pneumatic. A two way flow valve may be used with a spring return actuator, or a three way valve may be installed to both extend and retract the actuator pistons 32. The flow valves 30 can be connected to a pump 34 or compressor that is attached to a source of fluid which is typically a reservoir 36 for a hydraulic system. The solenoid flow valves 30 are electrically connected to a controller or computer 38 that supplies a voltage to the flow valves 30, energizing the solenoids such that hydraulic fluid flows into the actuator and extends the actuator piston 32. The computer 38 has an output corresponding to each flow valve 30. When the solenoid is deenergized the piston 30 retracts. The acceleration of the pistons 30 can be controlled by flow control valves (not shown) inserted between the actuators 26 and the solenoid valves 30 and again connected to the computer 38. The extension of the piston 32 moves the diaphragm toward the raft 22 which displaces the water in the same direction. The water displacement causes the raft 22 to move as indicated in FIG. 1. The actuators 26 may have large piston heads 40 located in the arrangement as shown in FIG. 2. The computer 38 may have a computer program with a predetermined sequence of operating instructions, wherein during each step of the program the computer provides a voltage to a predetermined number of solenoids in accordance with the operating instructions of the program. For example, during the first step of the program the computer might energize the solenoid valves 30 of actuators 1, 2 and 3. If these actuators are located at the rear of the raft 22, the extension of the actuator pistons 32 will cause the back of the raft 20 to raise up relative to the bottom of the pool 20. If this operating instruction is sequenced with a visual image 14 on the screen 16 depicting a raft vertically translating down a river (ie. riding through rapids), the lifting of the back of the raft 22 provides a physical movement approximating the motion of a raft as depicted on the screen 16. The operating instructions of the computer continue to extend and retract the actuators 26 in conjunction with the visual images 14 displayed on the screen 16, such that the raft 22 moves to approximate the movement of a raft as depicted on the screen 16. The diaphragm 24 can be attached to the pool bottom by flexible means such as springs that are parallel to the pool bottom, that allow the diaphragm 24 to expand and retract with the movement of the actuators 26. In the alternative, the diaphragm 24 can extend up the sides of the pool 20, to provide the additional diaphragm length allowing the diaphragm 24 to expand. The pool 20 may have a plurality of solenoid water valves 44 attached to a pump 46, that circulates the water from the pool 20 through the valves 44 and back into the pool 20. The solenoids of each valve again being attached to the computer 38, which supplies a voltage to the valves 44 to energize the solenoids. When the valves 44 are open, water is pumped into the pool 20, causing the pool to rise in the vicinity of the valves, such that the displaced water can simulate rippling waves. In addition to the water valves 44, the pool 20 can have a plurality of solenoid air valves 48 located at the pool bottom to direct a jet of air to the top surface of the pool 20. The air valves 48 are connected to the computer 38 and a compressor 50, wherein the air valves 48 control the pressure and flowrate of the air stream such that the air blowing out of the pool 20 simulates water mist. The opening of the valves 48 can again be controlled by operating instructions from a computer program stored in the computer 38. The program causing the valves to create waves and mist within the pool 20 simulate the body of water depicted on the screen 16. The pool 20 may also have a wave generator 52 at one end to induce a wave along the surface of the pool such that the audience 18 is splashed with water and to further cause the raft 22 to move in accordance with the visual images 14 depicted on the screen 16. The water 44 and air valves 48 can also cause water to splash onto or into the raft 22 and audience 18. Rocks 54 and other structures often found in rivers can be placed in the pool 20. The rocks 54 can be located on platforms to move the rocks up and down, so that the rocks can become visually apparent when the river depicted on the screen shows rocks, etc. An occasional alligator of the like can also be added. The simulator 10 can be provided with an audio system to simulate the sounds of a river. The audio system provides sound in conjunction with the visual images displayed on the screen 16 and the movement of the raft 22, to provide the audience 18 with the full effect of rafting down a river.

Figure 3:
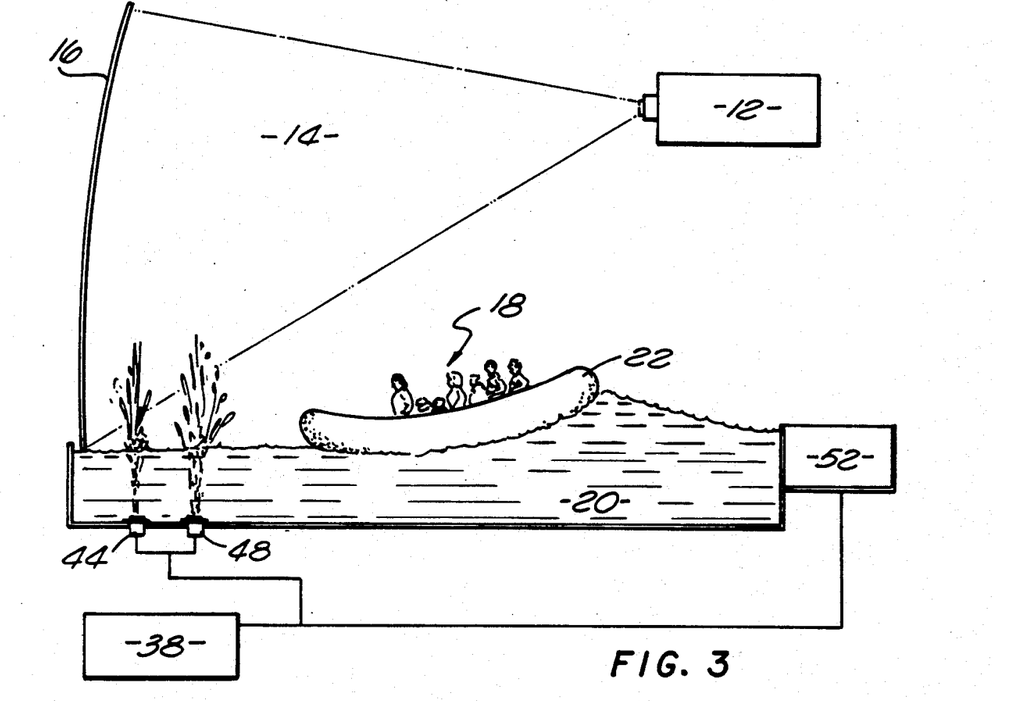
FIG. 3 is a side view of an alternate embodiment of a simulator, wherein the simulated motion of the raft is created by a wave generator located at one end of the pool.
Figure 4:
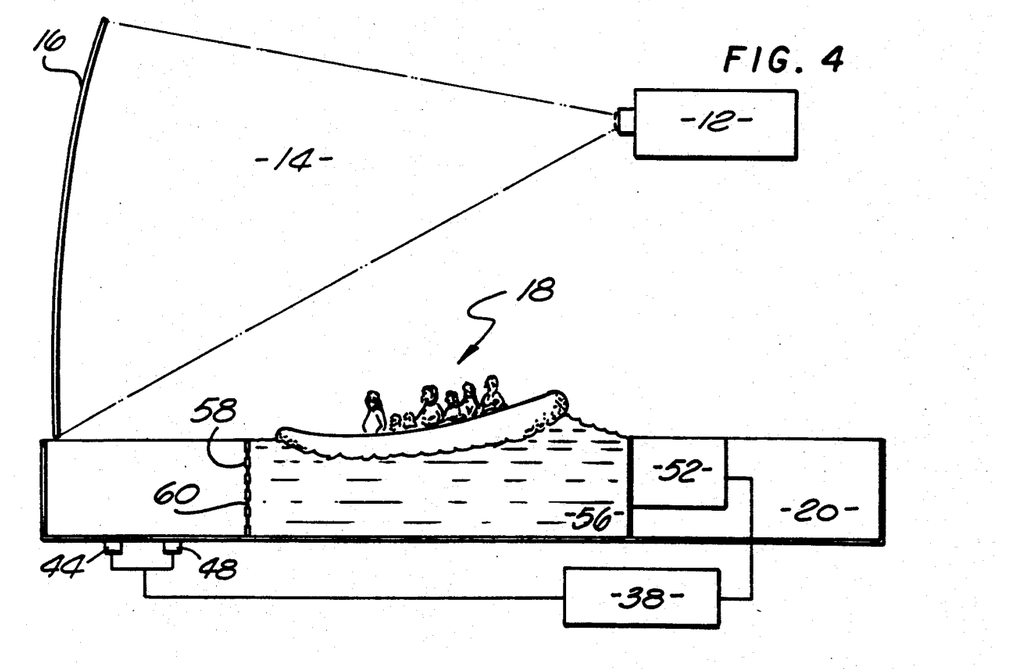
FIG. 4 is a side view of a simulator similar to FIG. 3, wherein the raft is in a second pool that has a wave generator to induce waves in the second pool to move the raft.

As alternative embodiments, the raft 22 can be moved by wave generators as shown in FIGS. 3 and 4. A wave generator as described in U.S. Pat. Application Ser. No. 416,988 by Robinson could be used and is hereby incorporated by reference. The wave generator of the above referenced application has a valve and pump attached to a chamber that extends above the water level of the pool. To operate, the valve is closed and a vacuum is created in the chamber that pulls water from the pool into the chamber. When a wave is desired, the pump is turned off and the valve is opened, wherein air rushes through the valve located above the water such that the pressure of the air pushes the water out of the chamber into the pool. The valve can have a solenoid that is attached to and controlled by the computer 38, such that the computer 38 can control the frequency and the amplitude of the wave. The waves are induced into the pool 20 in accordance with the operating instructions of a computer program such that the raft 22 moves in accordance with the visual images 14 depicted on the screen 16. This embodiment may also have air valves 48 to produce water mist.

FIG. 4 shows the raft 22 floating on a second pool 56 that has a wave generator 52. The second pool 56 has a wall 58 constructed to separate the water in the first pool 20 from the water in the second pool 56, such that the waves generated in the second pool 56 to move the raft 22, do not interfere with any waves or mist generated in the first pool 20 by the water 44 and air 48 valves incorporated therein. The walls 58 may have a plurality of holes 60 that permit fluid communication between the pools, but restrict flow such that the raft wave of the second pool 56 does not interfere with the water valve waves of the first pool 20. The wave generator 52 and valves are again connected to a computer 38 to synchronize the water movement with a theater projection and audio systems. The second pool 56 could be added to the simulator 10 shown in FIG. 1, wherein the diaphragm 24 would be below only the second pool 56. In that embodiment, the second pool 56 could isolate the raft 22 and prevent waves generated by the wave generator 52 in the first pool 20 from interfering with the water displacement created by the actuators 26 and diaphragm 24 of the second pool 56.

Figure 5:
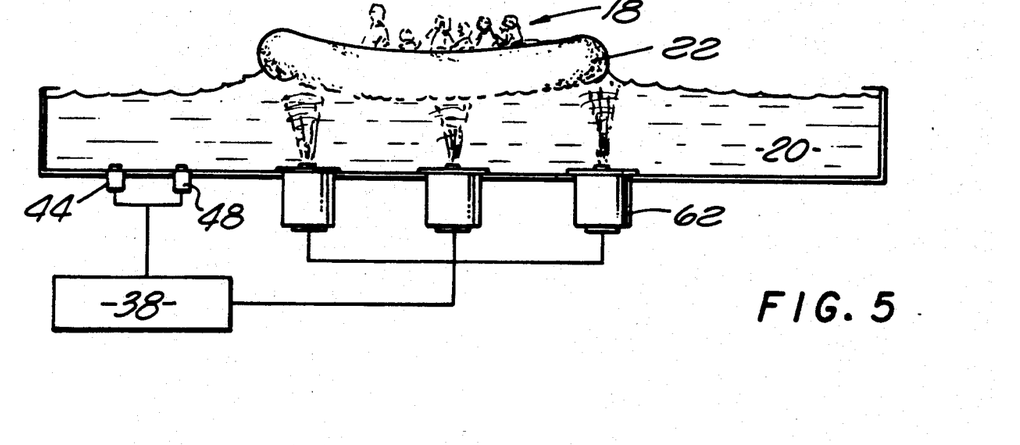
FIG. 5 is a side view of an alternate embodiment of a simulator, wherein the pool has a plurality of water valves located at the bottom to direct a stream of water toward the raft to move the raft accordingly.

FIG. 5 shows an alternate embodiment, wherein the actuators are replaced by water valves 62 that produce a stream of water that is directed toward the raft 22. The water causes the raft 22 to move in the same manner as the simulator shown and described in FIG. 1. The valves 62 again having solenoids that are attached to a computer 38. This simulator can also have additional water valves 44 and air valves 48 that operate in the manner described above. This embodiment does not need the diaphragm or the actuators and is thus a less expensive alternative to the embodiments shown.

Figure 6:
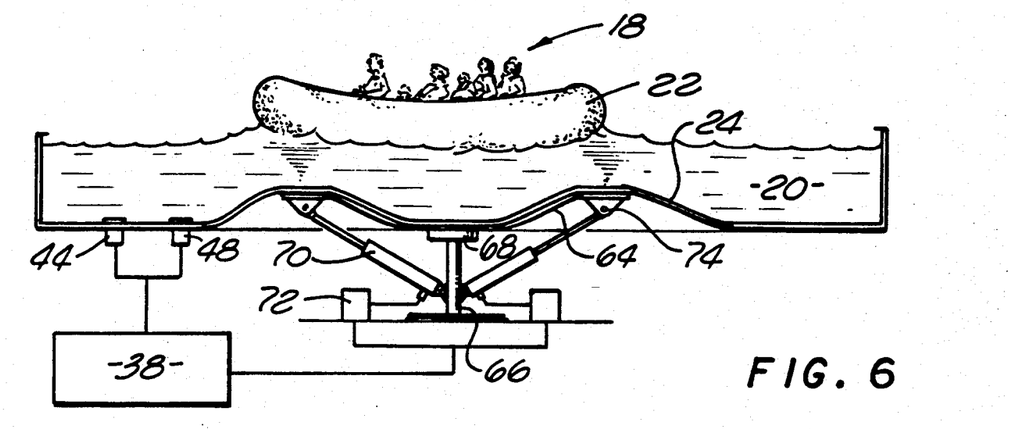
FIG. 6 is a side view of an alternate embodiment of a simulator that has a diaphragm at the bottom of the pool that is moved by a flex-plate located under the diaphragm and controlled by actuators, the movement of the diaphragm displaces the water beneath the raft causing the raft to simulate the motion of a raft as depicted on the screen.

Another embodiment is shown in FIG. 6 that is similar to the simulator as shown and described in FIG. 1. This simulator has a flexible diaphragm 24 on the bottom of the pool that is adjacent a flexible plate 64. The flexible plate 64 is attached to and supported by a column 66 about which the plate 64 bends. The plate 64 can be attached to the column by a universal joint 68 to allow easier movement about the column 66. Attached to the column 66 and plate 64 are a plurality of actuators 70, each actuator having a solenoid flow valve 72. The actuators 70 can be either hydraulic or pneumatic and have the requisite pumps, compressors and reservoirs to complete the system. The actuators 70 are pivotably attached to the plate 64 at an oblique angle, such that when the actuator pistons 74 extend and retract, the plate 64 moves as shown. The movement of the plate 64 moves the diaphragm 24 and displaces the water beneath the raft 22. The water displacement moves the raft 22 in the same manner as the simulator shown in FIG. 1. The solenoid valves 72 are attached to the computer 38, the simulator can again have water valves 44, air valves 48 and a wave generator to more closely simulate the visual images depicted on the screen 16. The flexible plate 64 should be constructed from a flexible material such as fiberglass that will allow the plate 64 to be bent into a compound curvature without yielding the plate 64. As an alternative, the actuators 70 could be attached directly to the diaphragm to move the same.

Figure 7:
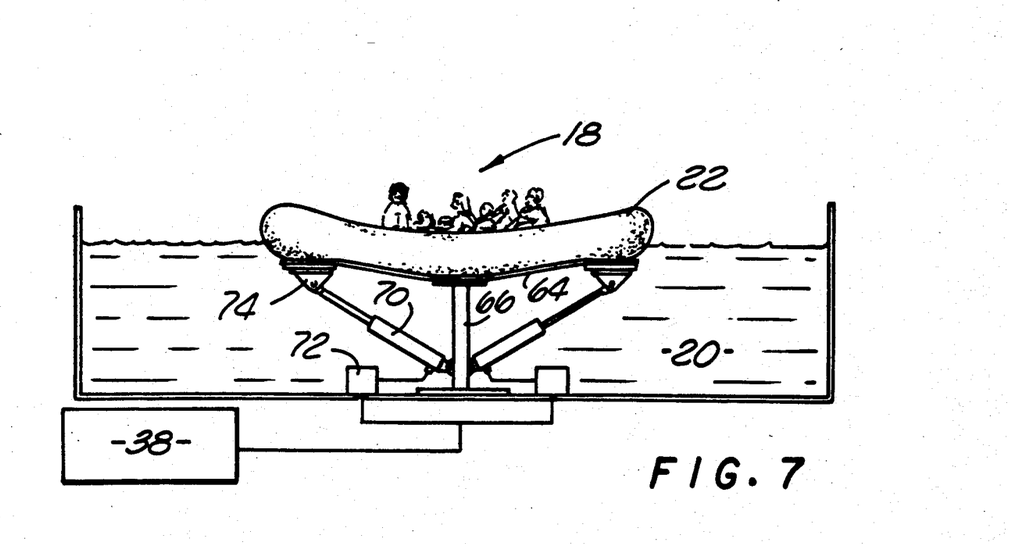
FIG. 7 is a side view of a simulator similar to that shown in FIG. 6, wherein the flex-plate is attached directly to the raft.

FIG. 7 shows another embodiment wherein the flexible plate 64 of the simulator shown in FIG. 6 is directly attached to the raft 22. The flexible plate 64 and raft 22 are moved by the actuators 70, in accordance with operating instructions provided by a computer 38 connected to the solenoid valves 72 of the actuator 70. In the preferred embodiment there are four actuators 70 to move the four ends of the plate 64. The plate 64 may be constructed from a composite material typically used in the constructed of aircraft, wherein the composite can be strong enough to support the raft and a predetermined weight of people and be flexible enough to allow the plate 64 to bend into compound curvatures without yielding the plate 64. The plate 64 and actuators 70 can be attached to and supported by a column 66, such that the column 66 bears the weight of the audience and supporting structure, or the raft can be supported by the water of the pool 20, wherein the flexible plate 64 merely moves and does not support the raft 22. In this embodiment, the flexibility of the plate 64 should be such that the movement of the actuators 70, causes movement of the plate 64 and raft 22, at locations remote from where the actuators 70 are attached to the plate 64. This embodiment can have water valves, air valves and a wave generator all connected to a computer 38, which synchronizes the different elements so that the ride simulates a raft floating down a river.

Although one raft 22 is shown, it is to be understood that a plurality of rafts 22 could be used. Each raft 22 would have means as described above, to move the raft 22 independently from the other floatation devices 22. For example, one raft may move upward while another adjacent raft moves downward to more simulate a wave passing under the rafts. It is preferable to move the rafts within a simulator that has a 360° screen, so that the audience in each raft is provided with an unobstructed panoramic view.

While certain exemplary embodiments have been described in detailed and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A simulator for an audience that simulates floating through a body of water, comprising:
    a projection system constructed to display visual images onto a screen, said visual images depicting movement through a body of water;
    at least one floatation device adapted to support the audience such that the audience can view said visual images displayed on said screen;
    a pool of water surrounding and supporting said floatation device;
    wave means generally connected to said pool for inducing waves in said pool, said waves passing under said floatation device to cause said floatation device to move;

wave control means operatively connected to said wave means for controlling the motion of said waves in said pool such that said floatation device movement approximates the movement of a floatation device through the body of water depicted on said screen; and, a computer program to provide said wave means with a sequence of operating instructions to create said waves, such that said waves cause floatation device movement to approximate the movement of said floatation device through the body of water depicted on said screen.

2. The simulator as recited in claim 1, wherein said floatation device is a raft.

3. The simulator as recited in claim 1, further comprising water valve means operatively connected to said pool for directing at least one stream of water in said pool essentially perpendicular to said floatation device, such that said water valve means induces water displacement in said pool approximating at least one wave.

4. The simulator as recited in claim 1, further comprising air valve means operatively connected to said pool for directing at least one stream of air in said pool essentially perpendicular to said floatation device, such that said stream of air is released from said pool to approximate water mist.

5. The simulator as recited in claim 1, further comprising an audio system operatively connected to said theater projection system, to provide sound to the audience such that the audience hears sounds approximating the sounds of a floatation device moving through the body of water depicted on said screen.

6. The simulator as recited in claim 1, wherein said projection system and said screen provide 360° of viewing images.

7. A simulator for an audience that simulates floating through a body of water, comprising:
  a projection system constructed to display visual images onto a screen, said visual images depicting movement through a body of water;
  at least one floatation device adapted to support the audience such that the audience can view said visual images displayed on said screen;
  a first pool of water surrounding said floatation device;
  a second pool of water supporting said floatation device adjacent said first pool of water;
  wave means operatively connected to said second pool for inducing waves in said second pool, said waves passing under said floatation device to cause said floatation device to move; and,
  wave control means operatively connected to said wave means for controlling the motion of said waves in said second pool such that said floatation device movement approximates the movement of a floatation device through the body of water depicted on said screen.

8. The simulator as recited in claim 7, wherein said wave control means includes a computer with a computer program to provide said wave means with a sequence of operating instructions to create said waves, such that said waves cause said floatation device movement to approximate the movement of said floatation device through the body of water depicted on said screen.

9. The simulator as recited in claim 7, wherein said floatation device is a raft.

10. The simulator as recited in claim 7 further comprising water valve means operatively connected to said first pool for directing at least one stream of water in said first pool essentially perpendicular to said floatation device, such that said water valve means induces water displacement in said first pool approximating at least one wave.

11. The simulator as recited in claim 7, further comprising air valve means operatively connected to said first pool for directing at least one stream of air in said first pool essentially perpendicular to said floatation device, such that said stream of air is released from said first pool to approximate water mist.

12. The simulator as recited in claim 7, wherein said first pool and said second pool are separated by a wall with a plurality of openings to allow fluid communication between said pools.

13. The simulator as recited in claim 7, further comprising an audio system operatively connected to said theater projection system, to provide sound to the audience such that the audience hears sounds approximating the sounds of a floatation device moving through the body of water depicted on said screen.

14. The simulator as recited in claim 7, wherein said projection system and said screen provide 360° of viewing images.

15. A simulator for an audience that simulates floating through a body of water, comprising:
  a projection system constructed to display visual images onto a screen, said visual images depicting movement through a body of water;
  at least one floatation device adapted to support the audience such that the audience can view said visual images displayed on said screen;
  a pool of water having a top and bottom surface, said pool of water surrounds and supports said floatation device;
  motion means operatively connected to said bottom of said pool for selectively displacing said water beneath said floatation device such that said water causes said floatation device to move in a wave type motion; and,
  a plurality of actuators that extend and retract to displace said water shows said actuators, said actuators being located generally beneath said floatation device such that said water displacement causes said floatation device to move in said wave type motion such that said floatation device movement approximates the movement of a floatation device through the body of water depicted on said screen.

16. The simulator as recited in claim 15, wherein said motion means is a plurality of water valves located at said bottom of said pool, said water valves direct streams of water in said pool under said floatation device such that said water streams cause said floatation device to move in said wave type motion.

17. The simulator as recited in claim 15, wherein said motion means includes a diaphragm operatively connected to said actuators, said diaphragm having a predetermined flexibility such that selective areas of said diaphragm move relative to said floatation device, wherein said water above said diaphragm is displaced causing said floatation device to move in said wave type motion.

18. The simulator as recited in claim 17, wherein said motion means includes a flexible plate operatively connected to said diaphragm and said actuators, said flexible plate having a predetermined ductility such that selective areas of said flexible plate and said diaphragm move relative to said floatation device, wherein said water above said diaphragm is displaced causing said floatation device to move in said wave type motion.

19. The simulator as recited in claim 15, wherein said motion control means includes a computer with a computer program to provide said actuators with a sequence of operating instructions to cause said actuators to extend and retract such that said water displaces and moves said floatation device, wherein said floatation device movement approximates the movement of said floatation device through the body of water depicted on said screen.

20. The simulator as recited in claim 15, wherein said floatation device is a raft.

21. The simulator as recited in claim 15, further comprising water valve means operatively connected to said pool for directing at least one stream of water in said first pool essentially perpendicular to said floatation device, such that said water valve means induces water displacement in said pool approximating at least one wave.

22. The simulator as recited in claim 15, further comprising air valve means operatively connected to said pool for directing at least one stream of air in said first pool essentially perpendicular to said floatation device, such that said stream of air is released from said pool to approximate water mist.

23. The simulator as recited in claim 15, further comprising an audio system operatively connected to said projection system, to provide sound to the audience such that the audience hears sounds approximating the sounds of a floatation device moving through the body of water depicted on said screen.

24. The simulator as recited in claim 15, wherein said projection system and said screen provide 360° of viewing images.

25. A simulator for an audience that simulates floating through a body of water, comprising:
   a projection system constructed to display visual images onto a screen, said visual images depicting movement through a body of water;
   at least one floatation device adapted to support the audience such that the audience can view said visual images displayed on said screen;
   a pool of water that surrounds said floatation device having a top and bottom surface;
   a flexible plate attached to said floatation device;
   actuation means operatively connected to said flexible plate for selectively moving said flexible plate such that said floatation device moves in a wave type motion; and,
   actuation control means operatively connected to said actuation means for controlling said flexible plate movement such that said floatation device movement approximates the movement of a floatation device through the body of water depicted on said screen.

26. The simulator as recited in claim 25, wherein said actuation means includes a universal joint attached to said flexible plate and a plurality of actuators, said actuators being attached to said flexible plate such that said actuators move said plate about said universal joint.

27. The simulator as recited in claim 25, wherein said actuation control means includes a computer with a computer program to provide said actuation means with a sequence of operating instructions to cause said actuation means to move said flexible plate such that said floatation device movement approximates the movement of said floatation device through the body of water depicted on said screen.

28. The simulator as recited in claim 25, wherein said floatation device is a raft.

29. The simulator as recited in claim 25, further comprising water valve means operatively connected to said pool for directing at least one stream of water in said pool essentially perpendicular to said floatation device, such that said water valve means induces water displacement in said pool approximating at least one wave.

30. The simulator as recited in claim 26, further comprising air valve means operatively connected to said pool for directing at least one stream of air in said pool essentially perpendicular to said floatation device, such that said stream of air is released from said pool to approximate water mist.

31. The simulator as recited in claim 25, further comprising an audio system operatively connected to said projection system, to provide sound to the audience such that the audience hears sounds approximating the sounds of a floatation device moving through the body of water depicted on said screen.

32. The simulator as recited in claim 25, wherein said projection system and said screen provide 360° of viewing images.

33. A simulator for an audience that simulates floating through a body of water, comprising:
   a projection system constructed to display visual images onto a screen, said visual images depicting movement through a body of water;
   at least one raft adapted to support the audience such that the audience can view said visual images displayed on said screen;
   a pool of water surrounding and supporting said raft;
   water valve means operatively connected to said pool for directing at least one stream of water in said pool in a direction essentially perpendicular to said raft peripheral of said raft, such that said water valve means induces water displacement in said pool approximating at least one wave;
   air valve means operatively connected to said pool for directing at least one stream of air in said pool essentially perpendicular to said raft such that said stream of air is released from said pool to approximate water mist;
   wave means operatively connected to said pool for inducing waves in said pool, said waves passing under said raft to cause said raft to move; and,
   wave control means operatively connected to said wave means for controlling the motion of said waves in said pool such that said raft movement approximates the movement of a raft through the body of water depicted on said screen, said wave control means having a computer with a computer program to provide said wave means with a sequence of operating instructions to create said waves.

34. A simulator for an audience that simulates floating through a body of water, comprising:
   a projection system constructed to display visual images onto a screen, said visual images depicting movement through a body of water;
   at least one raft adapted to support the audience such that the audience can view said visual images displayed on said screen;
   a first pool of water surrounding said raft;

a second pool of water supporting said raft adjacent said first pool of water;

water valve means operatively connected to said first pool for directing at least one stream of water in said first pool essentially perpendicular to said raft such that said water valve means induces water displacement in said first pool approximating at least one wave;

air valve means operatively connected to said first pool for directing at least one stream of air in said first pool essentially perpendicular to said raft such that said stream of air is released from said first pool to approximate water mist;

wave means operatively connected to said second pool for inducing waves in said second pool, said waves passing under said raft to cause said raft to move; and, wave control means operatively connected to said wave means for controlling the motion of said waves in said second pool such that said raft movement approximates the movement of a raft through the body of water depicted on said screen, said wave control means having a computer with a computer program to provide said wave means with a sequence of operating instructions to create said waves.

35. A simulator for an audience that simulates floating through a body of water, comprising:

a projection system constructed to display visual images onto a screen, said visual images depicting movement through a body of water;

at least one raft adapted to support the audience such that the audience can view said visual images displayed on said screen;

a pool of water having a top and bottom surface, said pool of water surrounds and supports said raft;

a diaphragm operatively connected to said pool bottom, said diaphragm being located below said raft;

a plurality of actuators operatively connected to said diaphragm, said actuators extend and retract to move said diaphragm and displace said water beneath said raft such that said water displacement causes said raft to move in a wave type motion and, motion control means operatively connected to said actuators for controlling said displacement of said water in said pool such that said raft movement approximates the movement of a raft through the body of water depicted on said screen, said motion control means having a computer with a computer program to provide said actuators with a sequence of operating instructions to cause said actuators to extend and retract.

36. The simulator as recited in claim 35, further comprising air valve means operatively connected to said pool for directing at least one stream of air in said pool essentially perpendicular to said raft, such that said stream of air is released from said pool to approximate water mist.

37. The simulator as recited in claim 36, further comprising water valve means operatively connected to said pool for directing at least one stream of water in said pool essentially perpendicular to said raft, such that said water valve means induces water displacement in said pool approximating at least one wave.

38. The simulator as recited in claim 36, further comprising an audio system operatively connected to said projection system, to provide sound to the audience such that the audience hears sounds approximating the sounds of a raft moving through the body of water depicted on said screen.

39. A simulator for an audience that simulates floating through a body of water, comprising:

a projection system constructed to display visual images onto a screen, said visual images depicting movement through a body of water;

at least one raft adapted to support the audience such that the audience can view said visual images displayed on said screen;

a pool of water that surrounds said raft;

a flexible plate attached to said raft;

actuation means operatively connected to said flexible plate for selectively moving said flexible plate such that said raft moves in a wave type motion; and, actuation control means operatively connected to said actuation means for controlling said flexible plate movement such that said raft movement approximates the movement of a raft through the body of water depicted on said screen, said actuation control means having a computer with a computer program to provide said actuation means with a sequence of operating instructions to cause said actuation means to move said flexible plate.

40. The simulator as recited in claim 39, further comprising air valve means operatively connected to said pool for directing at least one stream of air in said pool essentially perpendicular to said raft, such that said stream of air is released from said pool to approximate water mist.

41. The simulator as recited in claim 40, further comprising water valve means operatively connected to said pool for directing at least one stream of water in said pool essentially perpendicular to said raft, such that said water valve means induces water displacement in said pool approximating at least one wave.

42. The simulator as recited in claim 40, further comprising an audio system operatively connected to said projection system, to provide sound to the audience such that the audience hears sounds approximating the sounds of a raft moving through the body of water depicted on said screen.

43. A simulator for an audience that simulates floating through a body of water, comprising:

a projection system constructed to display visual images onto a screen, said visual images depicting movement through a body of water;

at least one floatation device adapted to support the audience such that the audience can view said visual images displaed on said screen;

a pool of water having a top and bottom surface, said pool of water surrounds and supports said floatation device;

motion means operatively connected to said bottom of said pool for selectively displacing said water beneath said floatation device such that said water causes said floatation device to move in a wave type motion; and a plurality of water valves located at said bottom of said pool, said water valves direct streams of water in said pool under said floatation device such that said water streams cause said floatation device to move in said wave type motion such that said floatation device movement approximate the movement of a floatation device through the body of water depicted on said screen.

44. The simulator as recited in claim 43, wherein said motion control means includes a computer with a computer program to provide said water values with a sequence of operating instructions to cause said water values to release water such that said floatation device movement approximates the movement of said floatation device through the body of water depicted on said screen.

45. The simulator as recited in claim 44, wherein said floatation device is a raft.

46. The simulator as recited in claim 45, further comprising air valve means operatively connected to said pool for directing at least one stream of air in said first pool essentially perpendicular to said floatation device, such that said stream of air is released from said pool to approximate water mist.

47. The simulator as recited in claim 46, further comprising an audio system operatively connected to said projection system, to provide sound to the audience such that the audience hears sounds approximating the sounds of a floatation device moving through the body of water depicted on said screen.

48. The simulator as recited in claim 47, wherein said projection system and said screen provide 360° of viewing images.